(12) United States Patent
Watamura et al.

(10) Patent No.: US 10,001,811 B1
(45) Date of Patent: Jun. 19, 2018

(54) PORTABLE INFORMATION DEVICE

(71) Applicant: LENOVO (SINGAPORE) PTE. LTD., Singapore (SG)

(72) Inventors: Kenji Watamura, Yokohama (JP); Masayuki Amano, Yokohama (JP); Seita Horikoshi, Yokohama (JP); Takehito Yamauchi, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days. days.

(21) Appl. No.: 15/642,499

(22) Filed: Jul. 6, 2017

(30) Foreign Application Priority Data

Apr. 27, 2017 (JP) .................................. 2017-088291

(51) Int. Cl.
G06F 1/16 (2006.01)
(52) U.S. Cl.
CPC .......... G06F 1/1652 (2013.01); G06F 1/1616 (2013.01); G06F 1/1681 (2013.01)
(58) Field of Classification Search
CPC ..... G06F 1/1652; G06F 1/1681; G06F 1/1616
See application file for complete search history.

(56) References Cited

U.S. PATENT DOCUMENTS

| 8,804,349 | B2 * | 8/2014 | Lee | G06F 1/1641 |
| | | | | 361/749 |
| 2012/0044620 | A1 * | 2/2012 | Song | G06F 1/1616 |
| | | | | 361/679.01 |
| 2013/0021762 | A1 * | 1/2013 | van Dijk | G06F 1/1652 |
| | | | | 361/749 |
| 2014/0042293 | A1 * | 2/2014 | Mok | G06F 1/1652 |
| | | | | 248/682 |
| 2014/0111954 | A1 * | 4/2014 | Lee | G06F 1/1641 |
| | | | | 361/749 |
| 2015/0241925 | A1 * | 8/2015 | Seo | G06F 1/1681 |
| | | | | 361/679.27 |
| 2015/0366089 | A1 * | 12/2015 | Park | G06F 1/1641 |
| | | | | 361/679.01 |
| 2015/0378397 | A1 * | 12/2015 | Park | G06F 1/1652 |
| | | | | 361/679.27 |
| 2016/0062412 | A1 * | 3/2016 | Park | G06F 1/1616 |
| | | | | 361/679.27 |
| 2016/0085265 | A1 * | 3/2016 | Park | G06F 1/1681 |
| | | | | 361/807 |
| 2016/0135324 | A1 * | 5/2016 | Lee | F16M 11/38 |
| | | | | 248/346.01 |
| 2017/0364123 | A1 * | 12/2017 | Seo | G06F 1/1652 |

FOREIGN PATENT DOCUMENTS

JP 2014216025 A 11/2014

* cited by examiner

*Primary Examiner* — Steven T Sawyer
*Assistant Examiner* — Sagar Shrestha
(74) *Attorney, Agent, or Firm* — Shimokaji IP (57) ABSTRACT

A portable information device that can stably support a foldable display is provided. A portable information device includes: a first chassis member and a second chassis member, inner end surfaces, which are adjacent edges, of the first chassis member and the second chassis member being coupled to each other by a hinge mechanism so that the first chassis member and the second chassis member are foldable in two; a display that is disposed at inner surfaces of both the first chassis member and the second chassis member and that is foldable in two; and a first support plate and a second support plate supporting a back surface of the display.

5 Claims, 9 Drawing Sheets

PORTABLE INFORMATION DEVICE

FIELD OF THE INVENTION

The present invention relates to a portable information device including a foldable display disposed at the inner sides of a pair of foldable chassis members.

BACKGROUND OF THE INVENTION

In recent years, portable information devices including touch-panel liquid crystal displays and no physical keyboards, such as tablet PCs and smartphones, have been rapidly widespread. Displays of portable information devices of this type are preferably large in use, but are preferably small size when being carried. In view of this, in a proposed portable information device, a display as well as a chassis is made foldable by using a flexible display such as an organic electro luminescence (EL) display (see, for example, Patent Document 1).

[Patent Document 1] Japanese Patent Application Laid-Open No. 2014-216025

SUMMARY OF THE INVENTION

A flexible display as described above is very thin and is weak to an impact or the like. Thus, the flexible display needs to be stably supported on the inner surface of a chassis member that is movable to be folded in two. To achieve this configuration, it may be possible to provide a support member for supporting the flexible display on the inner surface of the chassis member, for example. This support member, however, needs to be also movable to be folded in two, and when a step or the like occurs in the folded portion, the display is curved so that production failures might occur.

The present invention has been made in view of problems in the conventional technique described above, and an object of an aspect of the present invention is to provide a portable information device in which a foldable display can be stably supported.

A portable information device according to an aspect of the present disclosure includes: a first chassis member and a second chassis member, an edge of the first chassis member and an edge of the second chassis adjacent to the edge of the first chassis member being coupled to each other by a hinge mechanism so that the first chassis member and the second chassis member are foldable in two; a display that is disposed at inner surfaces of both the first chassis member and the second chassis member and that is foldable in two; a first support plate disposed at the inner surface of the first chassis member and supporting a back surface of the display from a side of the first chassis member; a second support plate disposed at the inner surface of the second chassis member and supporting the back surface of the display from a side of the second chassis member; a first support base attached to the inner surface of the first chassis member and having a front surface supporting the first support plate; a second support base attached to the inner surface of the second chassis member and having a front surface supporting the second support plate; and an adjustment mechanism provided on at least one of the first support base or the second support base and configured to adjust at least one of an attachment position of the first support base relative to the inner surface of the first chassis member or an attachment position of the second support base relative to the inner surface of the second chassis member so as to make the front surface of the first support base and the front surface of the second support base flush with each other.

In the portable information device, the hinge mechanism may include a first hinge chassis fixed to the inner surface of the first chassis member, a second hinge chassis fixed to the inner surface of the second chassis member, and a hinge shaft rotatably coupling the first hinge chassis and the second hinge chassis to each other, the first hinge chassis may be the first support base, and the second hinge chassis may be the second support base, and the adjustment mechanism may be interposed at least one of between a back surface of the first hinge chassis and the inner surface of the first chassis member or between a back surface of the second hinge chassis and the inner surface of the second chassis member, and may be adjustment screws configured to adjust at least one of a positional relationship between the back surface of the first hinge chassis and the inner surface of the first chassis member or a positional relationship between the back surface of the second hinge chassis and the inner surface of the second chassis member.

In the portable information device, a plurality of sets of the adjustment screws may be provided on at least one of the first support base or the second support base.

In the portable information device, an end surface of the first support plate and an end surface of the second support plate opposed to the end surface of the first support plate may be in contact with each other in a state in which the first chassis member and the second chassis member are opened in a flat plate shape.

In the portable information device, the hinge mechanism may include a first hinge chassis fixed to the inner surface of the first chassis member, a second hinge chassis fixed to the inner surface of the second chassis member, and a hinge shaft rotatably coupling the first hinge chassis and the second hinge chassis to each other, the first hinge chassis may be the first support base, and the second hinge chassis may be the second support base.

In the portable information device, the hinge mechanism may be disposed at each of longitudinal ends of the edges of the first chassis member and the second chassis member.

According to the above-described aspect of the present disclosure, a portable information device in which a foldable display can be stably supported can be obtained.

DETAILED DESCRIPTION OF THE INVENTION

A preferred embodiment of a portable information device according to the present invention will be specifically described with reference to the attached drawings.

1. Overall Configuration of Portable Information Device

Figure 1:
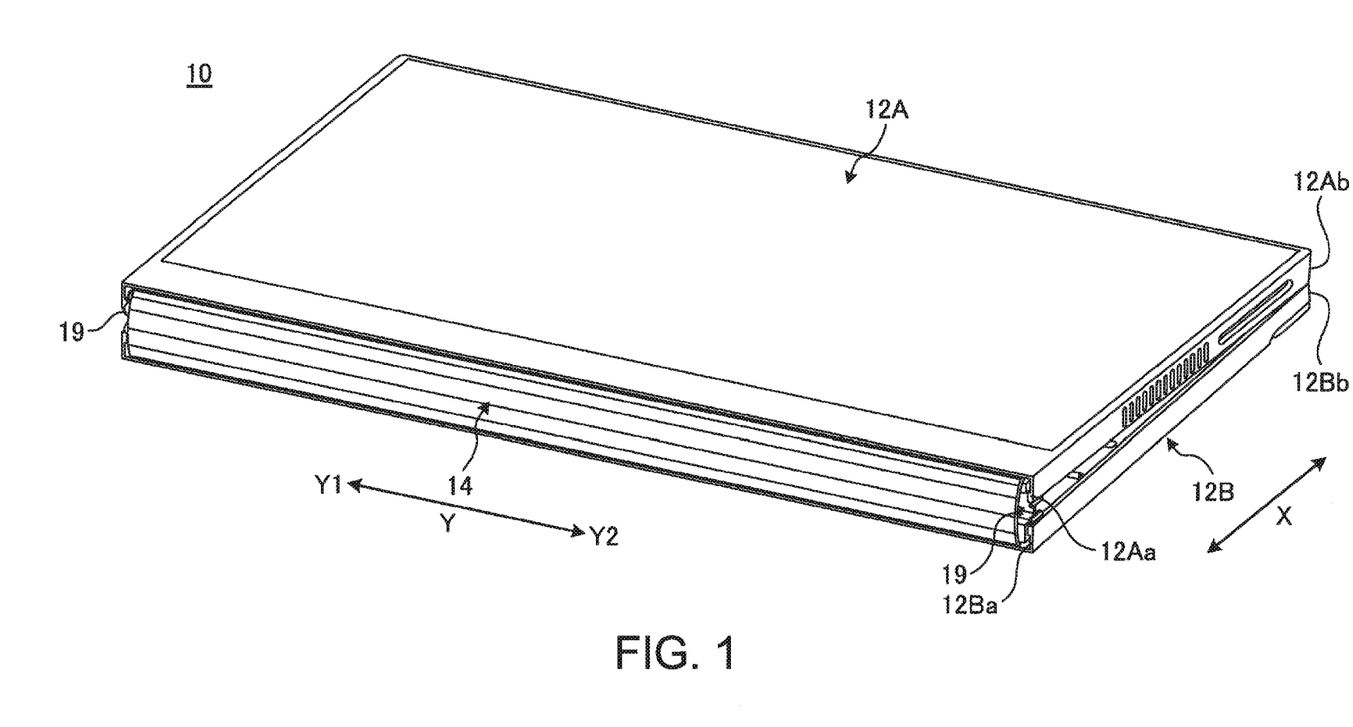
FIG. 1 is a perspective view illustrating a state in which a portable information device according to the present disclosure is closed in an accommodated state.
Figure 2:
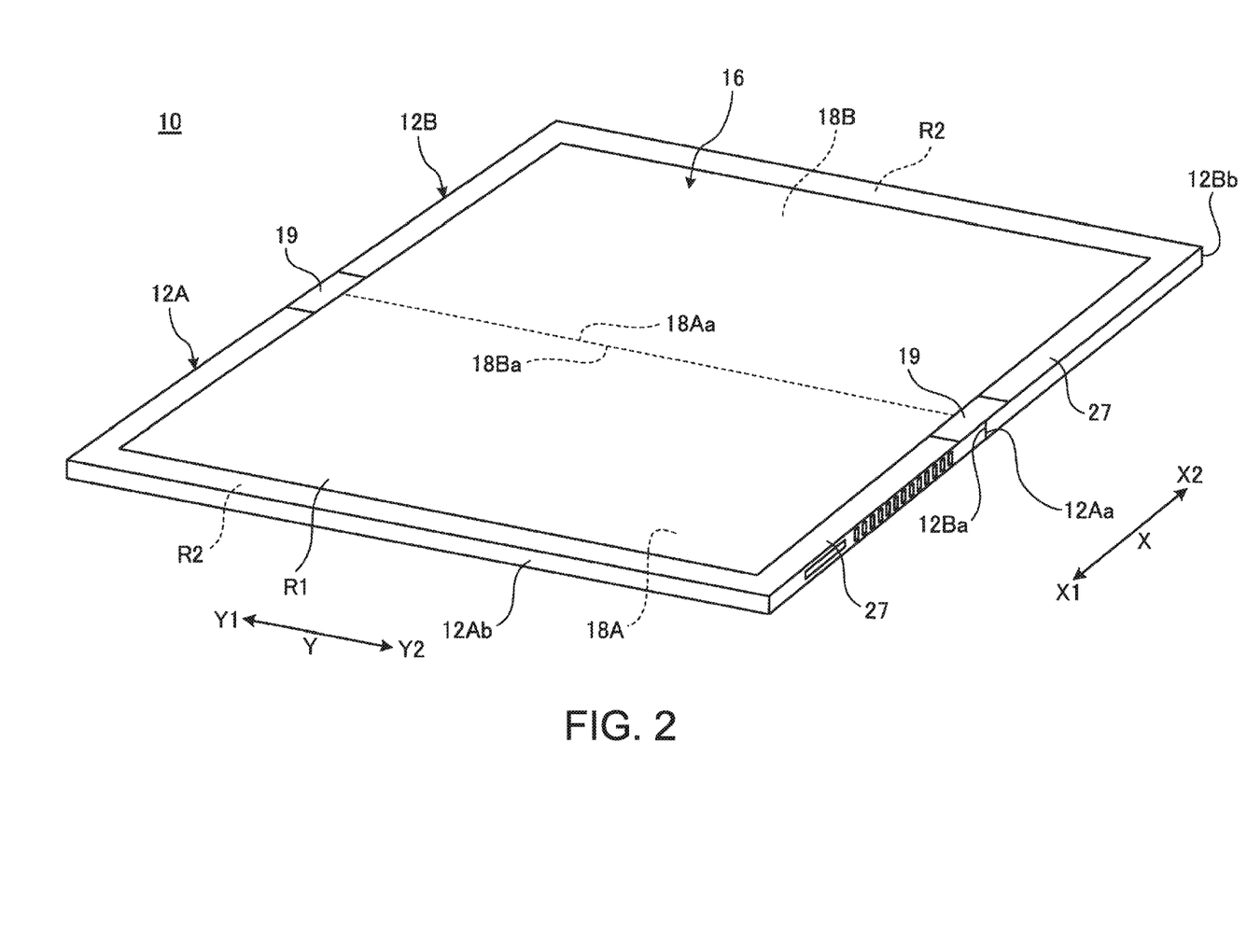
FIG. 2 is a perspective view schematically illustrating a state in which the portable information device illustrated in FIG. 1 is opened in a use state.
Figure 3:
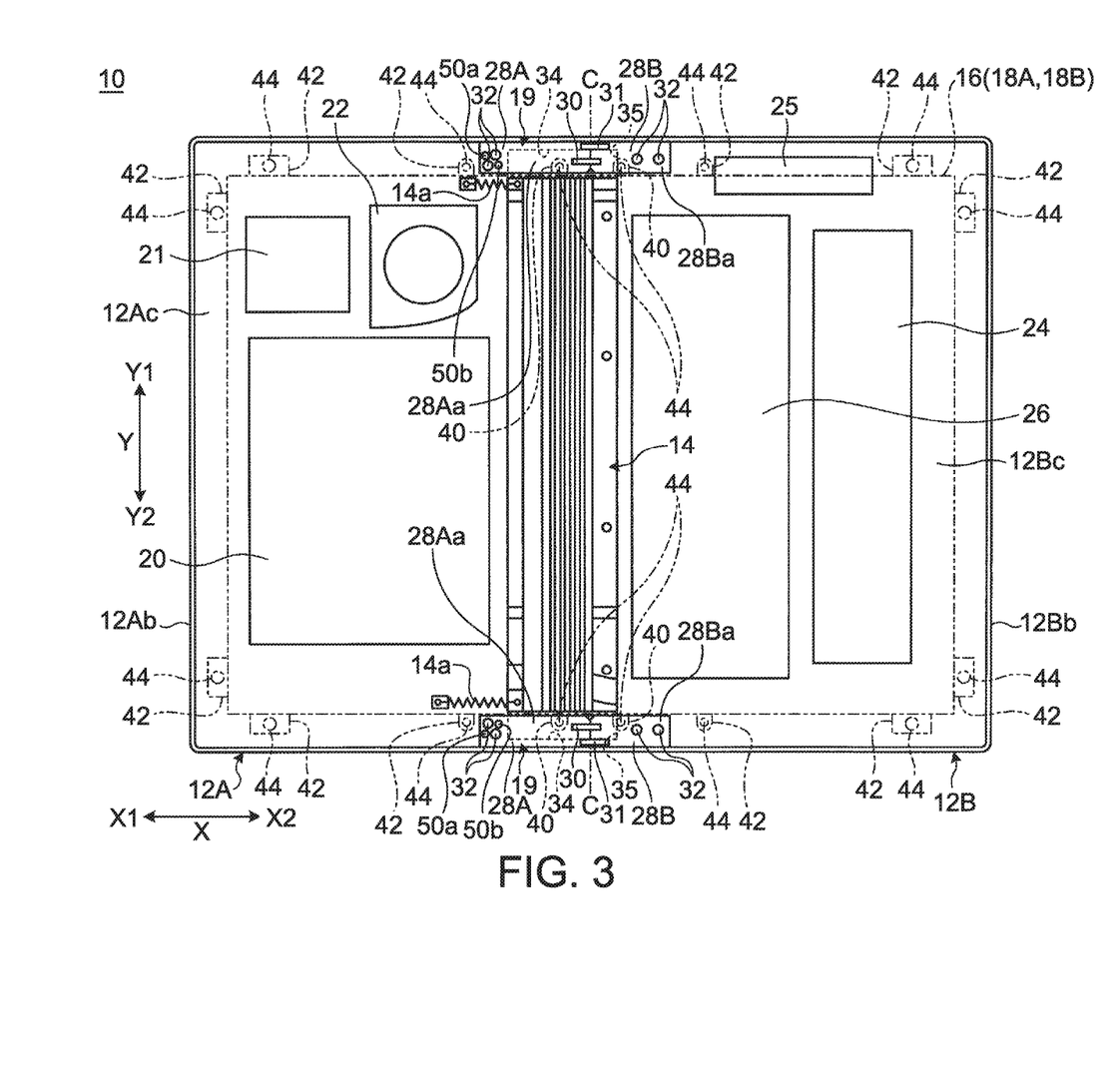
FIG. 3 is a plan view schematically illustrating an internal structure of the portable information device illustrated in FIG. 2.

FIG. 1 is a perspective view illustrating a state in which a portable information device 10 according to the present disclosure is closed in an accommodated state. FIG. 2 is a perspective view schematically illustrating a state in which the portable information device 10 illustrated in FIG. 1 is opened in a use state. FIG. 3 is a plan view schematically illustrating an internal structure of the portable information device 10 illustrated in FIG. 2.

As illustrated in FIGS. 1 and 2, the portable information device 10 includes a first chassis member 12A, a second chassis member 12B, a spine member 14, and a display 16. In this disclosure, as the portable information device 10, a tablet PC that is foldable in two like a book is used as an example. The portable information device 10 may be a cellular phone, a smartphone, or an electronic organizer.

Each of the chassis members 12A and 12B is a rectangular plate member in which side walls stand on three sides except a side corresponding to the spine member 14. Each of the chassis members 12A and 12B is made of, for example, a metal plate of, for example, stainless, magnesium, or aluminium or a fiber-reinforced resin plate including reinforcing fibers such as carbon fibers. The display 16 is fixed to the inner surfaces of the chassis members 12A and 12B through the first support plate 18A and the second support plate 18B. The chassis members 12A and 12B are coupled to each other through a pair of hinge mechanisms 19 and 19 provided at both ends of the spine member 14. The hinge mechanisms 19 couple the chassis members 12A and 12B so that the chassis members 12A and 12B are foldable to be in an accommodated state illustrated in FIG. 1 or a use state illustrated in FIG. 2. A line C represented as an alternate long and short dash line in FIG. 3 indicates a folding center C of a folding operation of the chassis members 12A and 12B.

In the chassis members 12A and 12B, inner end surfaces 12Aa and 12Ba facing the spine member 14 are disposed at the hinge side, and outer end surfaces 12Ab and 12Bb opposite to the spine member 14 are disposed at the open end side.

As illustrated in FIGS. 1 through 3, in the portable information device 10, directions from the center spine member 14 to the outer end surfaces 12Ab and 12Bb will be hereinafter referred to as X directions, and directions along the longitudinal direction of the spine member 14 will be hereinafter referred to as Y directions. The X directions will also be referred to as an X1 direction that is a direction from the spine member 14 to the outer end surface 12Ab or an X2 direction that is a direction from the spine member 14 to the other outer end surface 12Bb. Similarly, the Y directions will also be referred to as a Y1 direction that is a direction along the longitudinal direction of the spine member 14 and extending to one end (upward in FIG. 3) or a Y2 direction that is a direction toward the other end (downward in FIG. 3).

As illustrated in FIG. 3, a main board 20, a communication module 21, and a cooling fan 22, for example, are attached and fixed to the inner surface 12Ac of the first chassis member 12A with unillustrated screws or the like. A sub-board 24, an antenna 25, and a battery device 26, for example, are attached and fixed to the inner surface 12Bc of the second chassis member 12B with unillustrated screws or the like. The main board 20 is a printed wiring board for controlling the entire portable information device 10, and various electronic components such as an unillustrated central processing unit (CPU) and a memory are mounted on the main board 20. The communication module 21 is a device that performs information processing of various wireless communications such as a wireless local area network (LAN) that receives and transmits signals with the antenna 25. The cooling fan 22 is a fan for cooling heat generated by the CPU and other components mounted on the main board 20. The sub-board 24 is a printed wiring board that functions as a controller for controlling a display operation of the display 16. The battery device 26 is a power supply for the portable information device 10, and can be charged from an external power supply through an unillustrated power supply cable.

The display 16 is a touch panel liquid crystal display, for example. The display 16 has a foldable structure, that is, the display 16 can be folded when the chassis members 12A and 12B are folded. The display 16 is a flexible display having a flexible paper structure, such as an organic EL, and opens or closes with an opening/closing operation of the chassis members 12A and 12B.

Figure 4:
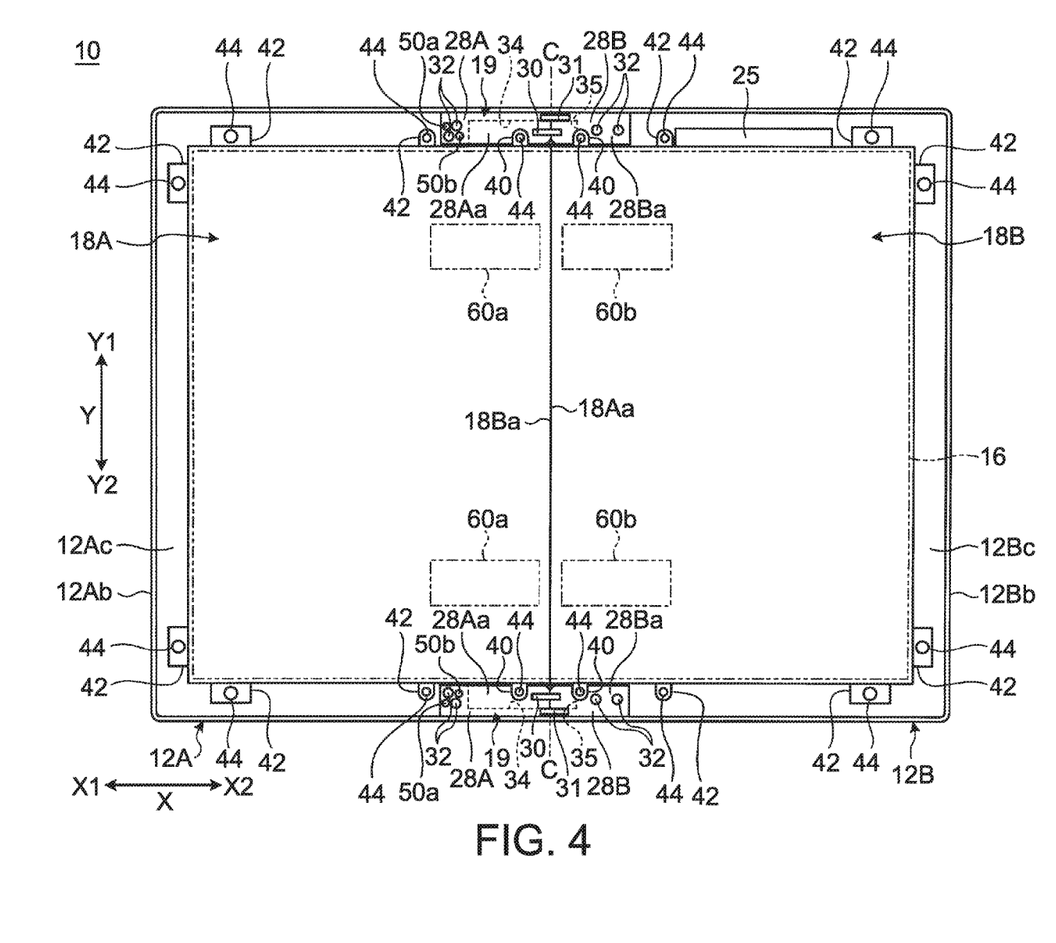
FIG. 4 is a plan view illustrating a state in which a first support plate and a second support plate are attached to the portable information device illustrated in FIG. 3.

FIG. 4 is a plan view illustrating a state in which the first support plate 18A and the second support plate 18B are attached to the portable information device 10 illustrated in FIG. 3.

As illustrated in FIG. 4, the display 16 is attached and fixed to the inner surfaces 12Ac and 12Bc of the chassis members 12A and 12B with the support plates 18A and 18B interposed therebetween. The back surface of a display surface (front surface) of the display 16 is bonded and fixed to the surfaces of the support plates 18A and 18B with an adhesive or a double face tape. In the case of the present disclosure, the support plates 18A and 18B are respectively disposed at the inner surfaces 12Ac and 12Bc of the chassis members 12A and 12B and can be folded with respect to the folding center C.

Each of the support plates 18A and 18B is made of a metal plate of, for example, stainless, magnesium, or aluminium or a fiber-reinforced resin plate obtained by impregnating reinforcing fibers such as carbon fibers in a matrix resin of a thermosetting resin or a thermoplastic resin. In the present disclosure, a carbon fiber-reinforced resin plate using carbon fibers as a reinforcing resin is used. To each of the support plates 18A and 18B, an unillustrated flexible sheet is fixed to the entire surface to which the display 16 is bonded, for example. The display 16 is adhered to the surface of the flexible sheet with an adhesive or the like. The support plates 18A and 18B are coupled to each other with the flexible sheet interposed therebetween so that the support plates 18A and 18B are foldable. A portion of the flexible sheet covering adjacent ends of the support plates 18A and 18B serves as a bending portion (flexible hinge) of the support plates 18A and 18B.

Figure 7A:
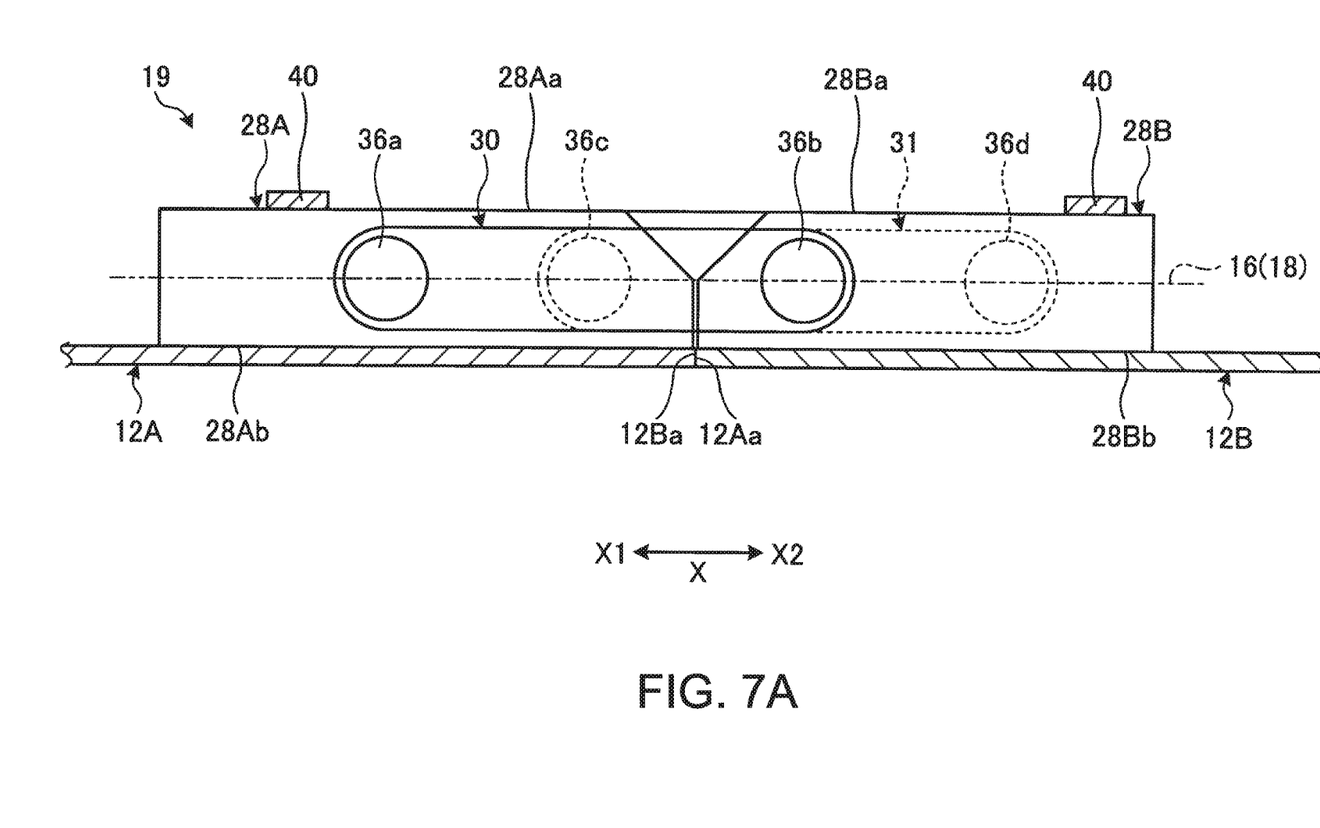
FIG. 7A is a side view schematically illustrating a display and a positional relationship between support plates and hinge mechanisms in a state in which a pair of chassis members are open.
Figure 7B:
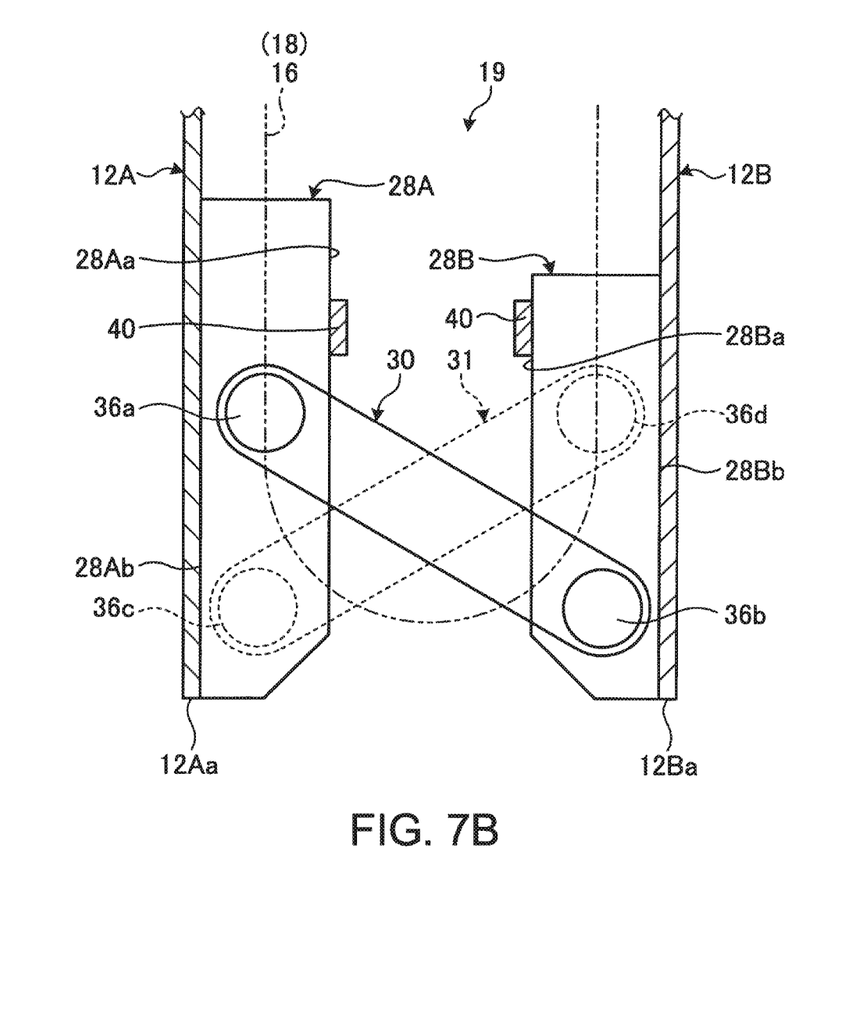
FIG. 7B is a side view illustrating a state in which the pair of chassis members are closed to be folded in two from the state illustrated in FIG. 7A.

Adjacent inner end surfaces 18Aa and 18Ba of the support plates 18A and 18B are in contact with each other in a use state in which the chassis members 12A and 12B are opened in a flat plate shape (see FIG. 7A). The inner end surfaces 18Aa and 18Ba of the support plates 18A and 18B are separated from each other in an accommodated state in which the chassis members 12A and 12B are folded in two (see FIG. 7B). As illustrated in FIG. 7B, a portion of the display 16 extending across the inner end surfaces 18Aa and 18Ba in the X directions is not fixed to the support plates 18A and 18B.

As illustrated in FIG. 2, a bezel member 27 is disposed on an outer peripheral portion of the surface of the display 16 with the bezel member 27 being attached and fixed to the inner surfaces 12Ac and 12Bc of the chassis members 12A and 12B with the support plates 18A and 18B sandwiched therebetween. The bezel member 27 is disposed to cover a non-display region (inactive region) R2 of the outer peripheral portion except a display region (active region) R1 of the surface of the display 16.

As illustrated in FIG. 1, in the accommodated state of the portable information device 10, the inner end surfaces 12Aa and 12Ba of the chassis members 12A and 12B are greatly separated from each other to create a gap. Thus, the portable information device 10 includes the spine member 14 to cover the gap so that it is possible to prevent exposure of internal components such as the display 16, the main board 20, and the battery device 26 from the gap.

The spine member 14 serves as a spine of the portable information device 10 when the portable information device 10 is folded. The spine member 14 is a flexible thin plate member. The spine member 14 is disposed across the interface between the chassis members 12A and 12B to cover the inner surfaces of the chassis members 12A and 12B across the inner end surfaces 12Aa and 12Ba (see FIG. 3). In the case of the present disclosure, the spine member 14 has a configuration in which a plurality of narrow plate members are arranged in the X directions and are coupled together with a flexible sheet.

An end of the spine member 14 towards the first chassis member 12A is slidable in the X directions on the inner surface 12Ac of the first chassis member 12A and is always biased in the X1 direction by a tension spring 14a (see FIG. 3). An end of the spine member 14 towards the second chassis member 12B is fixed to the inner surface 12Bc of the second chassis member 12B. In this manner, when the chassis members 12A and 12B are in the accommodated state, the spine member 14 is folded in two, whereas when the chassis members 12A and 12B are in the use state, the spine member 14 is opened in a flat plate shape.

In this manner, in the portable information device 10, the display 16 at the pair of inner sides of the chassis members 12A and 12B can be opened or closed by opening or closing the chassis members 12A and 12B through the pair of support plates 18A and 18B.

2. Hinge Mechanism

An example configuration of the hinge mechanisms 19 coupling the chassis members 12A and 12B to each other will be described.

As illustrated in FIGS. 3 and 4, the hinge mechanisms 19 are disposed to overlap the longitudinal ends of the spine member 14. The hinge mechanisms 19 are disposed outside the outer periphery of the display 16 and are in line symmetry with respect to the center in the Y directions. Each of the hinge mechanisms 19 includes a first hinge chassis (first support base) 28A, a second hinge chassis (second support base) 28B, a first arm 30, and a second arm 31.

The first hinge chassis 28A is a thin block-shaped part made of, for example, a resin or a metal. The first hinge chassis 28A is fixed to the inner surface 12Ac of the first chassis member 12A with fixing screws 32. The second hinge chassis 28B is a thin block-shaped part made of, for example, a resin or a metal. The second hinge chassis 28B is fixed to the inner surface 12Bc of the second chassis member 12B with fixing screws 32.

The first hinge chassis 28A has a recess 34 in the back surface that contacts the inner surface 12Ac of the first chassis member 12A (see FIG. 3). The recess 34 has a recessed shape having an opening extending from the inner side surface of the first hinge chassis 28A (side surface facing in the direction Y2 in the upper hinge mechanism 19 in FIG. 3) to the side surface facing the folding center C (side surface facing in the direction X2). The second hinge chassis 28B has a recess 35 in the back surface that contacts the inner surface 12Bc of the second chassis member 12B. The recess 35 has a recessed shape having an opening extending from the inner side surface of the second hinge chassis 28B (side surface facing in the direction Y2 in the upper hinge mechanism 19 in FIG. 3) to the side surface facing the folding center C (side surface facing in the direction X1). The recesses 34 and 35 communicate with each other with the folding center C sandwiched therebetween. The recesses 34 and 35 accommodate and support the ends of the spine member 14 in the Y directions so that the spine member 14 is slidable in the X directions. In this manner, it is possible to prevent both ends of the spine member 14 from rising in the folding operation.

An end of the first arm 30 is rotatably coupled to the first hinge chassis 28A through a first hinge shaft 36a, and the other end of the first arm 30 is rotatably coupled to the second hinge chassis 28B through a second hinge shaft 36b (see FIGS. 7A and 7B). An end of the second arm 31 is rotatably coupled to the first hinge chassis 28A through a third hinge shaft 36c, and the other end of the second arm 31 is rotatably coupled to the second hinge chassis 28B through a fourth hinge shaft 36d (see FIGS. 7A and 7B). The first arm 30 and the second arm 31 are arranged in parallel in the Y directions. The second hinge shaft 36b of the first arm 30 is sandwiched between the third hinge shaft 36c and the fourth hinge shaft 36d of the second arm 31. The third hinge shaft 36c of the second arm 31 is sandwiched between the first hinge shaft 36a and the second hinge shaft 36b of the first arm 30. In this manner, the first arm 30 and the second arm 31 are displaced from each other in each of the X directions and the Y directions.

When the chassis members 12A and 12B are folded with respect to the folding center C, the arms 30 and 31 of each of the hinge mechanisms 19 rotate through the hinge shafts 36a through 36d (see FIG. 7B). In this manner, the hinge mechanisms 19 couple the chassis members 12A and 12B to each other so that the chassis members 12A and 12B can rotate from the two-folded state to the open state in a flat plate shape.

3. Attachment Structure of Support Plate

Figure 5:
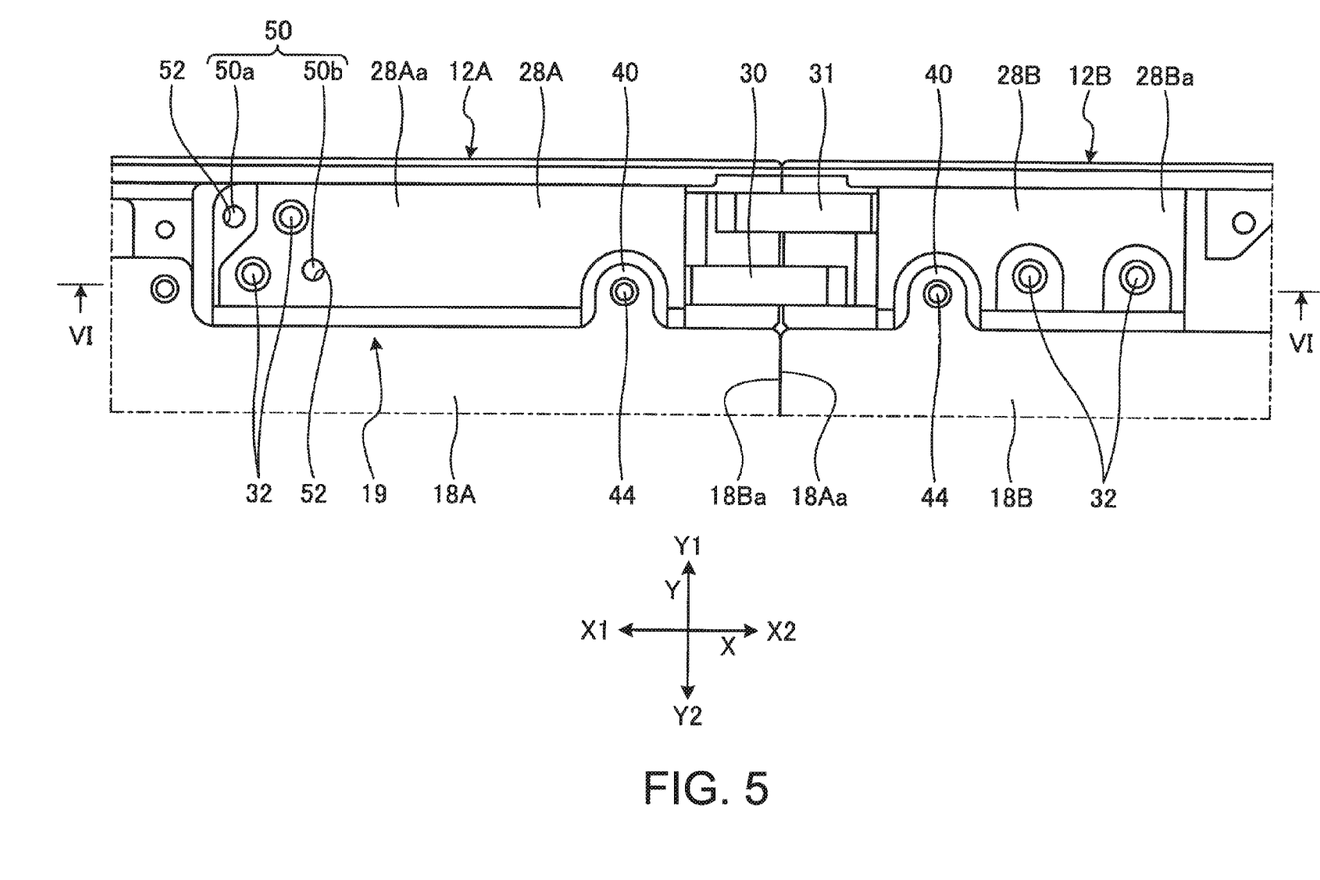
FIG. 5 is an enlarged plan view illustrating one of hinge mechanisms illustrated in FIG. 4 and its peripheral portion.

FIG. 5 is an enlarged plan view illustrating one of the hinge mechanisms 19 illustrated in FIG. 4 and its peripheral portion.

As illustrated in FIGS. 4 and 5, the support plates 18A and 18B are attached and fixed to the inner surfaces 12Ac and 12Bc of the chassis members 12A and 12B through a plurality of attachment tabs 40 and 42 projecting from the outer peripheries thereof.

The attachment tabs 40 are disposed to overlap the hinge mechanism 19 near the inner end surfaces 18Aa and 18Ba of the support plates 18A and 18B. The attachment tabs 40 are projecting tabs that project outward from the outer peripheral end surfaces of the support plates 18A and 18B. The first support plate 18A includes the attachment tabs 40 at positions slightly offset in the X1 direction from the ends of the inner end surface 18Aa in the Y directions, that is, at positions overlapping the first hinge chassis 28A. The second support plate 18B includes the attachment tabs 40 at positions slightly offset in the X2 direction from the ends of the inner end surface 18Ba in the Y directions, that is, at positions overlapping the second hinge chassis 28B.

The attachment tabs 42 are projecting tabs that project outward from the outer peripheral end surfaces of the support plates 18A and 18B. The plurality of attachment tabs 42 are disposed at appropriate positions on outer peripheral portions of the support plates 18A and 18B.

A through hole for screwing is formed at the center of each of the attachment tabs 40 and 42. The support plates 18A and 18B are fastened to the inner surfaces 12Ac and 12Bc of the chassis members 12A and 12B with attachment screws 44 through the through holes of the attachment tabs 40 and 42. The attachment tabs 40 are fastened to the hinge chassis 28A and 28B with the attachment screws 44 while being in contact with surfaces 28Aa and 28Ba of the hinge chassis 28A and 28B. The inner surfaces 12Ac and 12Bc of the chassis members 12A and 12B may have bosses provided with internal screws for screwing the attachment screws 44. Although FIG. 4 illustrates an example of a configuration in which the attachment tabs 40 have arc-shaped tips and the attachment tabs 42 have rectangular shapes similar to those of the attachment tabs 40, the shapes of the attachment tabs 40 and 42 may be changed as appropriate.

The support plates 18A and 18B are formed as separate members so that the support plates 18A and 18B can be folded in two in accordance with an opening/closing operation of the chassis members 12A and 12B. Thus, in a case where a step in the thickness direction were formed between the support plates 18A and 18B, this step would affect the display 16 disposed on the surfaces of the support plates 18A and 18B. Consequently, the display 16 might be curved or waved in the use state, resulting in production failures such as failures in visual recognition and in display. If the display 16 were curved, for example, the display 16 might fail to move along an opening/closing trajectory defined in design during an opening/closing operation between the use state and the accommodated state. In such a case, the display 16 would be subjected to an excessive load especially in the bending portion or its periphery to be damaged or cause failures.

Each of the support plates 18A and 18B is a plate having a surface area to some degree. Thus, the influence on the display 16 due to formation of a step between the support plates 18A and 18B is mainly caused by a step in a joint portion occurring when the support plates 18A and 18B are brought into contact with each other in the use state of the portable information device 10 to form one plate, that is, caused by a step occurring between the inner end surfaces 18Aa and 18Ba. In other words, failures in the display 16 can be sufficiently avoided by suppressing occurrence of a step between the inner end surfaces 18Aa and 18Ba of the support plates 18A and 18B.

In view of this, the portable information device 10 includes an adjustment mechanism 50 for suppressing occurrence of a step in the thickness direction between the inner end surfaces 18Aa and 18Ba of the support plates 18A and 18B.

4. Adjustment Mechanism

Figure 6A:
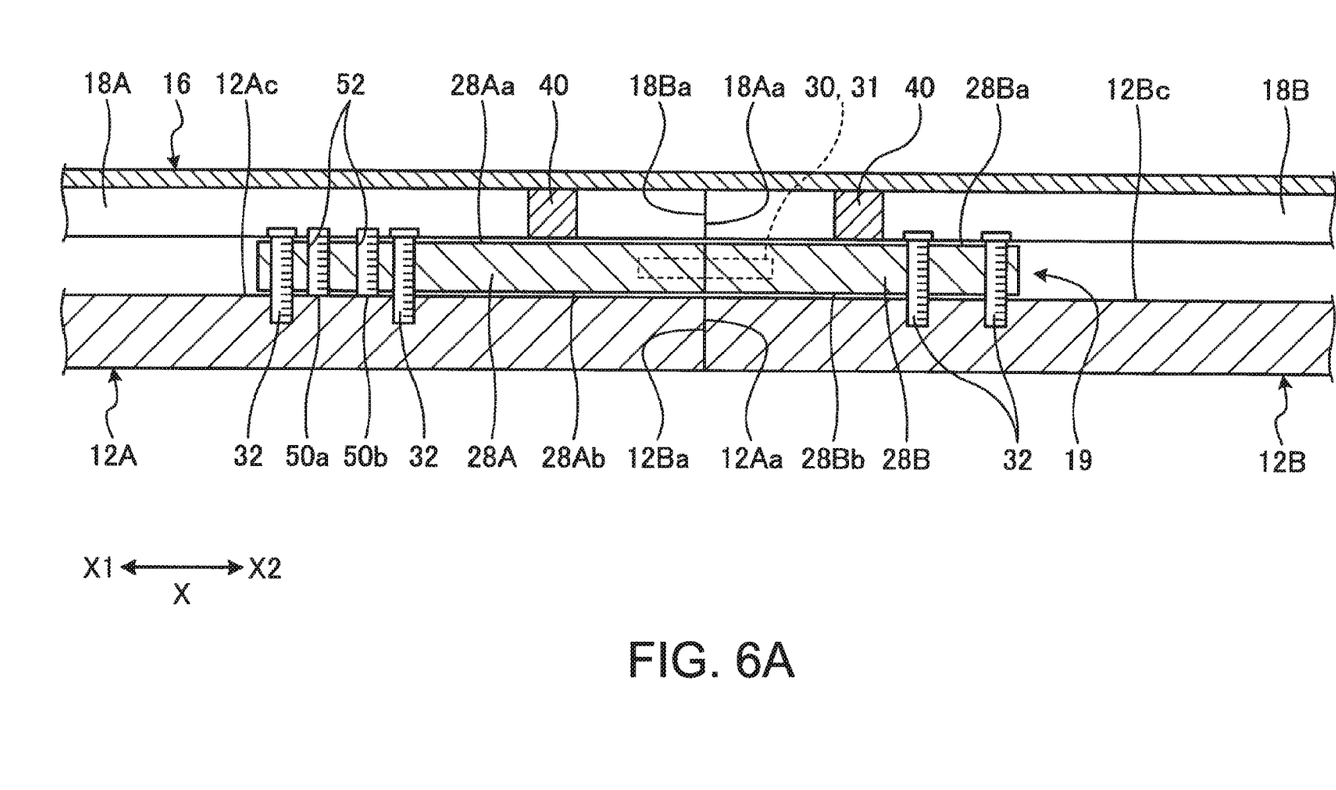
FIG. 6A is a schematic cross-sectional view taken along line VI-VI in FIG. 5.
Figure 6B:
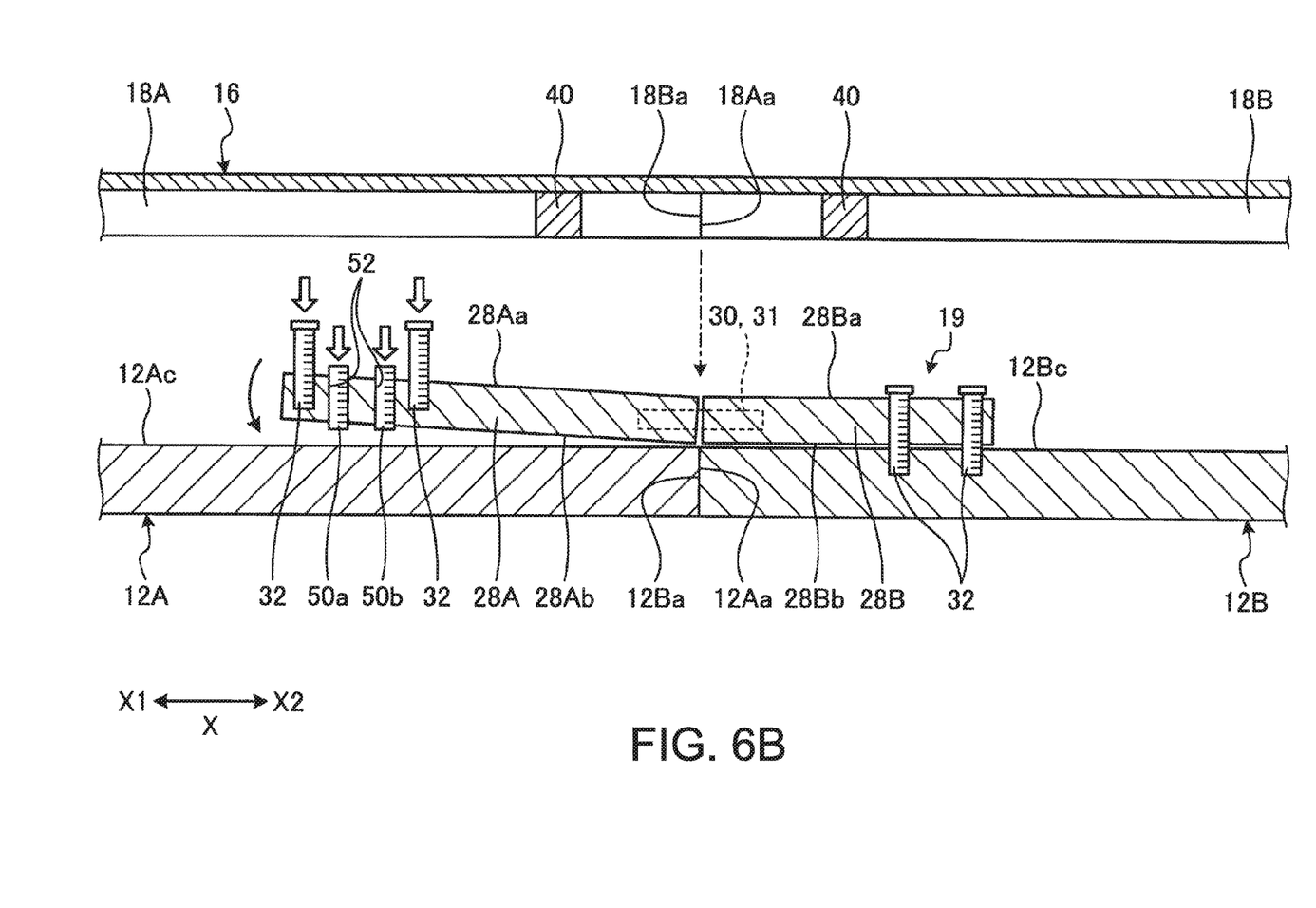
FIG. 6B is a schematic cross-sectional view illustrating an adjustment operation performed by an adjustment mechanism to place a hinge chassis in the attached state illustrated in FIG. 6A.

FIG. 6A is a schematic cross-sectional view taken along line VI-VI in FIG. 5. FIG. 6B is a schematic cross-sectional view illustrating an adjustment operation performed by the adjustment mechanism 50 to place the hinge chassis 28A and 28B in the attached state illustrated in FIG. 6A.

First, a configuration of the adjustment mechanism 50 will be described.

As illustrated in FIGS. 5 and 6A, the attachment tabs 40 of the support plates 18A and 18B are brought into contact with and fixed to the surfaces 28Aa and 28Ba of the hinge chassis 28A and 28B. The adjustment mechanism 50 is a mechanism that adjusts an attachment position of one of the hinge chassis, that is, the first hinge chassis 28A, to the chassis member 12A so that the surfaces 28Aa of the first hinge chassis 28A can be made flush with the surface 28Ba of the other second hinge chassis 28B and, thereby, occurrence of a step between the inner end surfaces 18Aa and 18Ba of the support plates 18A and 18B can be suppressed.

The adjustment mechanism 50 includes two adjustment screws 50a and 50b provided on the first hinge chassis 28A. The first hinge chassis 28A includes a pair of internal screw holes 52 and 52 into which the adjustment screws 50a and 50b are screwed. Each of the internal screw holes 52 penetrates the hinge chassis 28A in the thickness direction. In the case of the present disclosure, the internal screw holes 52 are disposed at positions displaced from attachment holes of the fixing screws 32 in such a manner the screw holes and the attachment holes are alternately arranged. That is, one adjustment screw 50a is disposed at the X1 side of one of the fixing screws 32 at the Y1 side, and the other adjustment screw 50b is disposed at the X2 side of the other fixing screw 32 at the Y2 side. The adjustment screws 50a and 50b are disposed across the center of the width of the hinge chassis 28A in the Y directions.

Next, a method for avoiding occurrence of a step between the support plates 18A and 18B by using the adjustment mechanism 50 will be described.

As illustrated in FIG. 6B, first, the second hinge chassis 28B not including the adjustment mechanism 50 is fixed onto the inner surface 12Bc of the second chassis member 12B with the fixing screws 32. That is, the second hinge chassis 28B is fixed with a back surface 28Bb opposite to a front surface 28Ba being in contact with the inner surface 12Bc. Next, the first hinge chassis 28A including the adjustment mechanism 50 is placed on the inner surface 12Ac of the first chassis member 12A. The hinge chassis 28A and 28B are rotatably coupled to each other through the arms 30 and 31.

Thereafter, the adjustment mechanism 50 is caused to operate to perform adjustment in such a manner that the front surface 28Aa of the first hinge chassis 28A is flush with the front surface 28Ba of the second hinge chassis 28B.

First, the adjustment screws 50a and 50b are screwed into the internal screw holes 52 from the front surface 28Aa of the first hinge chassis 28A. The adjustment screws 50a and 50b are operated with, for example, a tool such as a driver. Then, the tips of the adjustment screws 50a and 50b project from the back surface 28Ab of the first hinge chassis 28A to contact the inner surface 12Ac of the first chassis member 12A.

At this time, the adjustment mechanism 50 adjusts the length of projection of the adjustment screws 50a and 50b from the back surface 28Ab so that the attachment position, including an attachment angle and an attachment height, of the first hinge chassis 28A to the inner surface 12Ac can be adjusted. This adjustment is performed with reference to the front surface 28Ba of the second hinge chassis 28B previously fixed to the second chassis member 12B, for example, so that the front surface 28Aa of the first hinge chassis 28A is made flush with this front surface 28Ba. Examples of a method for making the surfaces 28Aa and 28Ba flush with each other include a method of adjusting the adjustment screws 50a and 50b while measuring the surfaces 28Aa and 28Ba with a measuring instrument such as a laser displacement sensor and a method of adjusting the adjustment screws 50a and 50b using, for example, a plate placed across the surfaces 28Aa and 28Ba as a reference.

Such an adjustment operation by the adjustment mechanism 50 enables the surfaces 28Aa and 28Ba of the hinge chassis 28A and 28B of each of the pair of hinge mechanisms 19 and 19 to be flush with each other. Then, the first hinge chassis 28A is fixed onto the inner surface 12Ac of the first chassis member 12A with the fixing screws 32. Subsequently, the attachment tabs 40 of the support plates 18A and 18B are brought into contact with the surfaces 28Aa and 28Ba of the hinge chassis 28A and 28B and fastened thereto with the attachment screws 44. The other attachment tabs 42 of the support plates 18A and 18B are also screwed to the inner surfaces 12Ac and 12Bc of the chassis members 12A and 12B with the attachment screws 44. In this manner, at least portions of the support plates 18A and 18B near the inner end surfaces 18Aa and 18Ba are fixed onto the surfaces 28Aa and 28Ba of the hinge chassis 28A and 28B that are flush with each other. As a result, the inner end surfaces 18Aa and 18Ba can be made flush with each other without occurrence of a step there between.

The adjustment mechanism 50 may be provided on the second hinge chassis 28B or may be provided on each of the hinge chassis 28A and 28B. For example, in the case where the adjustment mechanism 50 is provided on each of the hinge chassis 28A and 28B, the surfaces 28Aa and 28Ba are adjusted to be flush with each other, and then, the hinge chassis 28A and 28B are fastened to the chassis members 12A and 12B with the fixing screws 32.

5. Advantages of Portable Information Device

As described above, the portable information device 10 according to an aspect of the present disclosure includes: the first chassis member 12A and the second chassis member 12B, the inner end surfaces 12Aa and 12Ba, which are adjacent edges, of the first chassis member 12A and the second chassis member 12B being coupled to each other by the hinge mechanism 19 so that the first chassis member 12A and the second chassis member 12B are foldable in two; and the display 16 that is disposed at the inner surfaces 12Ac and 12Bc of both the first chassis member 12A and the second chassis member 12B and that is foldable in two. The portable information device 10 includes the first support plate 18A, the second support plate 18B, the first hinge chassis 28A serving as a first support base, the second hinge chassis 28B serving as a second support base, and the adjustment mechanism 50. The first support plate 18A is disposed at the inner surface 12Ac of the first chassis member 12A and supports the back surface of the display 16 from a side of the first chassis member 12A. The second support plate 18B is disposed at the inner surface 12Bc of the second chassis member 12B and supports the back surface of the display 16 from a side of the second chassis member 12B. The first hinge chassis 28A is attached to the inner surface 12Ac of the first chassis member 12A and has the front surface 28Aa supporting the first support plate 18A. The second hinge chassis 28B is attached to the inner surface 12Bc of the second chassis member 12B and has the front surface 28Ba supporting the second support plate 18B. The adjustment mechanism 50 is provided on least one of the first hinge chassis 28A or the second hinge chassis 28B and is configured to adjust at least one of an attachment position of the first hinge chassis 28A to the inner surface 12Ac of the first chassis member 12A or an attachment position of the second hinge chassis 28B to the inner surface 12Bc of the second chassis member 12B so as to make the front surface 28Aa of the first hinge chassis 28A and the front surface 28Ba of the second hinge chassis 28B flush with each other.

Accordingly, in the portable information device 10, the support plates 18A and 18B can be fixed onto the surfaces 28Aa and 28Ba of the hinge chassis 28A and 28B with the surfaces 28Aa and 28Ba being made flush with each other by using the adjustment mechanism 50. Thus, occurrence of a step between the support plates 18A and 18B can be suppressed. As a result, in the portable information device 10, the display 16 can be stably supported by the support plates 18A and 18B with occurrence of a step being suppressed so that failures such as curving of the display 16 can be prevented.

In the portable information device 10, the inner end surfaces 18Aa and 18Ba as opposed end surface of the support plates 18A and 18B are in contact with each other in the use state in which the chassis members 12A and 12B are opened in a flat plate shape. Thus, in the portable information device 10, the display 16 in the open state can be stably supported by the support plates 18A and 18B whose back surfaces configured in the shape of one plate. In addition, since a gap is not formed between the inner end surfaces 18Aa and 18Ba of the support plates 18A and 18B in the use state of the portable information device 10, rigidity in supporting the display 16 in, for example, a touch operation can be obtained.

In the portable information device 10, the support plates 18A and 18B are supported by the surfaces 28Aa and 28Ba of the hinge chassis 28A and 28B. Thus, in the portable information device 10, the support plates 18A and 18B supporting the display 16 can be supported by the hinge mechanisms 19 that perform an opening/closing operation of the chassis members 12A and 12B. In this manner, as illustrated in FIGS. 7A and 7B, in the portable information device 10, the display 16 is folded to form an arc with a predetermined curvature defined in design using the hinge mechanisms 19. That is, the display 16 can be smoothly folded in two in accordance with a rotation operation of the hinge mechanisms 19. As a result, the portable information device 10 can reduce rising of the display 16 or failures caused by an excessive load on the display 16 applied when the chassis members 12A and 12B is opened or closed. As indicated by the chain double-dashed line in FIGS. 7A and 7B, in the case of the present disclosure, the surface of the display 16 is configured to match the axial center of the hinge shafts 36a through 36d. In FIGS. 7A and 7B, the adjustment mechanism 50 and the fixing screws 32 are not shown.

In the portable information device 10, the adjustment mechanism 50 is constituted by the adjustment screws 50a and 50b that is disposed at least one of between the back surface 28Ab of the first hinge chassis 28A and the inner surface 12Ac of the first chassis member 12A or between the back surface 28Bb of the second hinge chassis 28B and the inner surface 12Bc of the second chassis member 12B and is configured to adjust at least one of a positional relationship between the back surface 28Ab and the inner surface 12Ac or a positional relationship between the back surface 28Bb and the inner surface 12Bc. In this manner, the adjustment mechanism 50 can adjust the surfaces 28Aa and 28Ba of the hinge chassis 28A and 28B only by operating the adjustment screws 50a and 50b. Since the adjustment mechanism 50 includes a set of a plurality of (two) adjustment screws 50a and 50b, flexibility in adjustment is high. The number of adjustment screws may be three or more.

In the portable information device 10, the hinge mechanisms 19 are disposed at longitudinal (Y-direction) ends of each of the inner end surfaces 12Aa and 12Ba as one edges of the chassis members 12A and 12B. In this manner, the support plates 18A and 18B are supported by the hinge mechanisms 19 and 19 at both ends. As a result, suppression of occurrence of a step between the inner end surfaces 18Aa and 18Ba of the support plates 18A and 18B can be further ensured so that the display 16 can be more stably supported.

The present invention is not limited to the embodiment described above, and can be, of course, freely changed without departing from the gist of the invention.

Although the support plates 18A and 18B are supported by the hinge chassis 28A and 28B in the configuration described above, supporting bases for the support plates 18A and 18B may be provided in addition to the hinge mechanisms 19. For example, as illustrated in FIG. 4, the support plates 18A and 18B may be supported by a pair of support bases (first support base and second support base) 60a and 60b in the X directions disposed across the inner end surfaces 18Aa and 18Ba of the support plates 18A and 18B. The support bases 60a and 60b are respectively fixed to the inner surfaces 12Ac and 12Bc of the chassis members 12A and 12B, for example, and two sets of the support bases 60a and 60b are provided in the Y directions.

We claim:

1. A portable information device comprising:
   a first chassis member and a second chassis member, wherein an edge of the first chassis member and an edge of the second chassis member adjacent to the edge of the first chassis member are coupled to each other by a hinge mechanism so that the first chassis member and the second chassis member are foldable with respect to each other;
   a display that is disposed at inner surfaces of both the first chassis member and the second chassis member and that is foldable in two;
   a first support plate disposed at the inner surface of the first chassis member, wherein the first support plate supports a back surface of the display from a side of the first chassis member;
   a second support plate disposed at the inner surface of the second chassis member, wherein the second support plate supports the back surface of the display from a side of the second chassis member;
   a first support base that is attached to the inner surface of the first chassis member and has a front surface that supports the first support plate;
   a second support base that is attached to the inner surface of the second chassis member and has a front surface that supports the second support plate; and
   an adjustment mechanism located on the first support base or the second support base and configured to adjust an attachment position of the first support base relative to the inner surface of the first chassis member or an attachment position of the second support base relative to the inner surface of the second chassis member so that the front surface of the first support base is flush with the front surface of the second support base;
   wherein the hinge mechanism includes a first hinge chassis fixed to the inner surface of the first chassis member, a second hinge chassis fixed to the inner surface of the second chassis member, and a hinge shaft rotatably coupling the first hinge chassis and the second hinge chassis to each other;
   wherein the first hinge chassis is the first support base;
   wherein the second hinge chassis is the second support base; and
   wherein the adjustment mechanism is interposed between a back surface of the first hinge chassis and the inner surface of the first chassis member or between a back surface of the second hinge chassis and the inner surface of the second chassis member, and has adjustment screws configured to adjust at least one of a positional relationship between the back surface of the first hinge chassis and the inner surface of the first chassis member or a positional relationship between the back surface of the second hinge chassis and the inner surface of the second chassis member.

2. The portable information device according to claim 1, wherein:
   a plurality of the adjustment screws are located on the first support base or the second support base.

3. The portable information device according to claim 1, wherein:
   an end surface of the first support plate and an end surface of the second support plate that is opposed to the end surface of the first support plate are in contact with each other when the first chassis member and the second chassis member are opened in a flat plate shape.

4. The portable information device according to claim 1, wherein:
   the hinge mechanism includes a first hinge chassis fixed to the inner surface of the first chassis member, a second hinge chassis fixed to the inner surface of the second chassis member, and a pair of hinge shafts rotatably coupling the first hinge chassis and the second hinge chassis to each other,
   wherein the first hinge chassis is the first support base, and
   wherein the second hinge chassis is the second support base.

5. The portable information device according to claim 1, wherein:
   the hinge mechanism is disposed at each longitudinal end of edges of the first chassis member and the second chassis member.

* * * * *